(12) United States Patent
Blasko

(10) Patent No.: US 10,587,214 B1
(45) Date of Patent: Mar. 10, 2020

(54) MATRIX CONVERTER OPERATION IN CURRENT CONTROL MODE WITH REGULATION OF OUTPUT VOLTAGE VECTOR

(71) Applicant: Hamilton Sundstrand Corporation, Charlotte, NC (US)

(72) Inventor: Vladimir Blasko, Avon, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/362,543

(22) Filed: Mar. 22, 2019

(51) Int. Cl.
*H02P 21/22* (2016.01)
*H02M 5/293* (2006.01)
*H02P 21/09* (2016.01)

(52) U.S. Cl.
CPC ............ *H02P 21/22* (2016.02); *H02M 5/293* (2013.01); *H02P 21/09* (2016.02); *H02M 2005/2932* (2013.01)

(58) Field of Classification Search
CPC ......... H02M 5/293; H02M 2005/2932; H02M 2005/2935; H02P 21/09
See application file for complete search history.

(56) References Cited

U.S. PATENT DOCUMENTS

| | | | | |
|---|---|---|---|---|
| 4,833,588 A | * | 5/1989 | Schauder | H02M 5/273 318/807 |
| 5,619,114 A | * | 4/1997 | Blasko | H02P 23/16 318/802 |
| 5,905,644 A | * | 5/1999 | Blasko | H02M 7/219 318/801 |
| 5,949,672 A | * | 9/1999 | Bernet | H02M 5/271 363/159 |
| 7,869,236 B2 | | 1/2011 | Mohan et al. | |
| 8,599,577 B2 | | 12/2013 | Kajouke et al. | |
| 9,923,456 B2 | * | 3/2018 | Yoshinaga | H02M 1/126 |
| 10,320,306 B1 | * | 6/2019 | Blasko | H02M 5/297 |
| 2002/0041171 A1 | * | 4/2002 | Cho | H02P 21/141 318/727 |
| 2003/0020428 A1 | * | 1/2003 | Masaki | H02P 6/18 318/727 |

(Continued)

*Primary Examiner* — Yusef A Ahmed
(74) *Attorney, Agent, or Firm* — Locke Lord LLP; Scott D. Wofsy; Judy R. Naamat

(57) ABSTRACT

A matrix converter system having a current control mode operation is provided. The matrix converter system includes a matrix converter that includes a plurality of switches. A unity current reference vector having an amplitude of one is determined that defines an angle and frequency of an output current vector as a function of a reference phase angle, which is a function of the output current vector and an output voltage vector representing feedback signals of a multiphase signal output to a load. The unity current reference vector is used to control the matrix converter, to cause the output current vector to be aligned with the unity current reference vector. A unity voltage reference vector having an amplitude of one is provided that defines a reference angle and frequency as a function of a zero phase angle. The output voltage vector and the unity voltage reference vector are aligned to determine the reference phase angle as an angle between the aligned output voltage vector and the output current vector.

18 Claims, 8 Drawing Sheets

(56) References Cited

U.S. PATENT DOCUMENTS

| | | | | |
|---|---|---|---|---|
| 2010/0164429 A1* | 7/2010 | Ide | H02P 21/14 | 318/802 |
| 2011/0247900 A1* | 10/2011 | Blasko | B66B 1/302 | 187/247 |
| 2012/0170333 A1* | 7/2012 | Bando | H02M 7/5395 | 363/56.01 |
| 2013/0058144 A1* | 3/2013 | Hiramatsu | H02M 1/12 | 363/131 |
| 2014/0160824 A1* | 6/2014 | Inomata | H02M 5/293 | 363/150 |
| 2014/0268970 A1* | 9/2014 | Tanaka | H02M 5/297 | 363/163 |
| 2015/0003136 A1* | 1/2015 | Inomata | H02M 5/293 | 363/163 |
| 2015/0115906 A1* | 4/2015 | Ebisu | H02M 1/00 | 323/217 |
| 2015/0130432 A1* | 5/2015 | Yamazaki | H02M 5/297 | 323/272 |
| 2015/0137779 A1* | 5/2015 | Takase | H02M 5/297 | 323/273 |
| 2015/0280597 A1* | 10/2015 | Takase | H02M 1/12 | 323/271 |
| 2015/0295506 A1* | 10/2015 | Inomata | H02M 5/271 | 323/282 |
| 2016/0036364 A1* | 2/2016 | Yamazaki | H02P 21/141 | 318/400.02 |
| 2017/0294862 A1* | 10/2017 | Takahashi | H02P 21/22 | |
| 2017/0359005 A1* | 12/2017 | Ahmed | H02P 23/14 | |
| 2018/0048242 A1* | 2/2018 | Ichiki | H02M 5/27 | |
| 2018/0294755 A1* | 10/2018 | Mori | B62D 5/0463 | |
| 2019/0157870 A1* | 5/2019 | Harnefors | H02M 7/53871 | |

* cited by examiner

MATRIX CONVERTER OPERATION IN CURRENT CONTROL MODE WITH REGULATION OF OUTPUT VOLTAGE VECTOR

STATEMENT REGARDING FEDERALLY SPONSORED RESEARCH OR DEVELOPMENT

This invention was made with government support under contract number DE-AR00000891, under the ARPA-E FOA Circuits Program, titled Power Conversion Through Novel Current Source Matrix Converter, awarded by the U.S. Department of Energy, April 2018. The government has certain rights in the invention.

BACKGROUND

1. Field of the Disclosure

The present disclosure relates to a matrix converter, and more particularly, to a matrix converter in current control mode with regulation of an output voltage vector.

2. Description of Related Art

Matrix converters are generally used as alternating current (AC)-to-AC converters that receive a multiphase input and produce a multiphase output. Traditional matrix converters operate in voltage control mode (VCM) such that the output voltage is controlled directly based upon the input voltage. In systems that utilize VCM, input inductor-capacitor (LC) circuits are implemented at the input of the matrix converter. The input LC circuit generally includes capacitors connected between each phase of the input. These capacitors create low impedance paths between phases and thus, the matrix converter cannot be controlled to provide short circuits between input phase lines without risking damage to the switching elements. Since the matrix converter cannot create output voltages higher than the line-to-line input voltages, the matrix converter's ability to provide output voltage without distortion is limited. Specifically, the matrix converter is not able to provide an output voltage that is greater than 86.6% of the input voltage without distortion.

While conventional methods and systems have generally been considered satisfactory for their intended purpose, there is still a need in the art for a matrix converter that can operate safely regardless of the output voltage level.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a matrix converter system having a current control mode operation. The system includes a matrix converter that includes a plurality of switches. The matrix converter is coupled at its input to a multiphase voltage source input and coupled at its output to a multiphase output. A generator is connected to the multiphase voltage source input, wherein the generator includes internal inductances. A controller having a pulse width modulation (PWM) control circuit is configured to control the plurality of switches to generate energy within the internal inductances of the generator. A unity current reference vector generator is configured to determine a unity current reference vector having an amplitude of one that defines an angle and frequency of an output current vector as a function of a reference phase angle, wherein the reference phase angle is a function of the output current vector and an output voltage vector that represent feedback signals of the current and voltage, respectively, of the multiphase output signal. A controller having a pulse width modulation (PWM) control circuit is configured to control the matrix converter via the plurality of switches to generate energy within the internal inductances of the generator, wherein the controller receives the unity current reference vector and controls the matrix converter to cause the output current vector to be aligned with the unity current reference vector. A unit voltage vector generator is configured to provide a unity voltage reference vector having an amplitude of one that defines a reference angle and frequency as a function of a zero phase angle. A reference phase angle determination module is configured to receive and align the output voltage vector and the unity voltage reference vector and to determine the reference phase angle as an angle between the aligned output voltage vector and the output current vector.

In embodiments, alignment of the output current vector and the unit reference vector can be performed within a single period of the multiphase output signal.

In embodiments, the reference phase angle determination module can apply a phase locked loop to align the output current and the unit reference vector.

In embodiments, the reference phase angle determination module can include a current position shift regulator that can be configured to shift position of the output current to adjust the reference phase angle until the reference phase angle equals zero.

In embodiments, the system can further include Q and D harmonic regulators that can be configured to operate, respectively, on differences between Q and D components of each of the unity voltage reference vector multiplied by a reference voltage and the output voltage vector to control the output voltage vector in a stationary reference frame through controlling the output voltage vector's Q and D components.

In embodiments, the output vector's Q and D components are controlled individually.

In embodiments, the Q and D harmonic regulators apply a transfer function to the differences, wherein the transfer function uses a proportional gain Kp and integration of a harmonic component having a resonant frequency ω and an integral gain KI.

In embodiments, the system can further include a Q synchronous regulator that is configured to operate in a synchronous reference frame on a difference between a Q component of a reference voltage multiplied by a Q component of the unity voltage reference vector and a Q component of the output voltage vector to output a Q current component provided toward to low voltage side of the matrix converter.

In embodiments, the reference phase angle determination module comprises a D synchronous regulator that is configured to operate in a synchronous reference frame on a difference between a D component of a reference voltage multiplied by a D component of the unity voltage reference vector and a D component of the output voltage vector to determine the reference phase angle.

In embodiments, the Q and D synchronous reference frame regulators can be proportional integral (PI) regulators.

In another aspect, a method of controlling operation of a matrix converter operating in a current control mode operation is provided. The matrix converter includes a plurality of switches. The matrix converter is coupled at its input to a multiphase voltage source input and outputs a multiphase output signal to a load. The method includes determining a unity current reference vector having an amplitude of one that defines an angle and frequency of an output current vector as a function of a reference phase angle, wherein the reference phase angle is a function of the output current vector and an output voltage vector that represent feedback signals of the current and voltage, respectively, of the multiphase output signal. The method further includes receiving the unity current reference vector. A PWM is controlled via the plurality of switches to generate energy within internal inductances of a generator of the multiphase voltage source and to cause the output current vector to be aligned with the unity current reference vector. The method further comprises providing a unity voltage reference vector having an amplitude of one that defines a reference angle and frequency as a function of a zero phase angle, receiving and aligning the output voltage vector and the unity voltage reference vector, and determining the reference phase angle as an angle between the aligned output voltage vector and the output current vector.

In embodiments, alignment of the output current vector and the unit reference vector can be performed within a single period of the multiphase output signal.

In embodiments, the method can further include applying a phase locked loop to align the output current and the unit reference vector.

In embodiments, aligning the output voltage vector and the unity voltage reference vector can include shifting position of the output current to adjust the reference phase angle until the reference phase angle equals zero.

In embodiments, the method can further include operating, respectively, on differences between Q and D components of each of the unity voltage reference vector multiplied by a reference voltage and the output voltage vector to control the output voltage vector in a stationary reference frame through controlling the output voltage vector's Q and D components.

In embodiments, the output vector's Q and D components can be controlled individually.

In embodiments, controlling the output voltage vector's Q and D components can include applying a transfer function to the differences, wherein the transfer function uses a proportional gain Kp, and integration of a harmonic component having a resonant frequency $\omega$ and an integral gain KI.

In embodiments, the method can further include operating in a synchronous reference frame on a difference between a Q component of a reference voltage multiplied by a Q component of the unity voltage reference voltage and a Q component of the output voltage vector to output a Q current component provided toward the low voltage side of the matrix converter.

In embodiments, the method can further include operating in a synchronous reference frame on a difference between a D component of a reference voltage multiplied by a D component of the unity voltage reference voltage and a D component of the output voltage vector to determine the reference phase angle.

In embodiments, controlling the output voltage vector in a synchronous reference frame can include applying a proportional integral process.

These and other features of the systems and methods of the subject disclosure will become more readily apparent to those skilled in the art from the following detailed description of the embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE EMBODIMENTS

A matrix converter system is disclosed herein that operates in a current control mode (CCM). The matrix converter system includes a matrix converter and a controller configured to control the matrix converter to cause a current vector that represents current output by the matrix converter to be aligned with a unity current reference vector. The controller can include a pulse width modulation (PWM) control circuit. The controller provides a unity voltage reference vector that has an amplitude of one and defines a reference angle as a function of a zero phase angle. The controller is configured to cause an output voltage vector that represents voltage output by the matrix converter to be aligned with the unity voltage reference vector. A desired voltage alignment can be provided for a given load within a single period of the output current. The reference angle can be quickly adjusted to achieve a desired alignment, even when the load is unknown and/or is changing.

Additionally, or alternatively, the controller can operate, respectively, on Q and D components of each of the unity voltage reference vector and the output voltage vector to control the output voltage vector. In embodiments, these Q and D components can be operated on in a stationary reference frame using harmonic regulators. In other embodiments, these Q and D components can be operated on in a synchronous reference frame using synchronous reference frame regulators.

The matrix converter does not include an inductor-capacitor (LC) input filter and thus, there are no line-to-line capacitors on the input side of the matrix converter. The input of the matrix converter is connected to receive power from a multiphase generator. The generator includes internal inductances on each phase. Capacitors are connected between each output phase of the matrix converter and ground.

The matrix converter system is capable of operating in a boost mode. When the voltage on the output capacitors is relatively small, switches of a switching matrix of the matrix converter may be operated to short phase lines to increase energy within the internal inductances of the generator when short-circuited. This is possible due to the absence of the LC circuit at the input, which removes the low impedance line-to-line capacitors. Upon generation of energy within the internal inductances of the generator, the switches of the matrix converter may then be controlled to provide current to charge the output capacitors using the generated energy stored in the inductances of the generator. This way, the output capacitors may be charged to a voltage greater than that of the input voltage. Once the voltage on the output capacitors is sufficient, the matrix converter may be controlled normally to control the output to a load.

Figure 1:
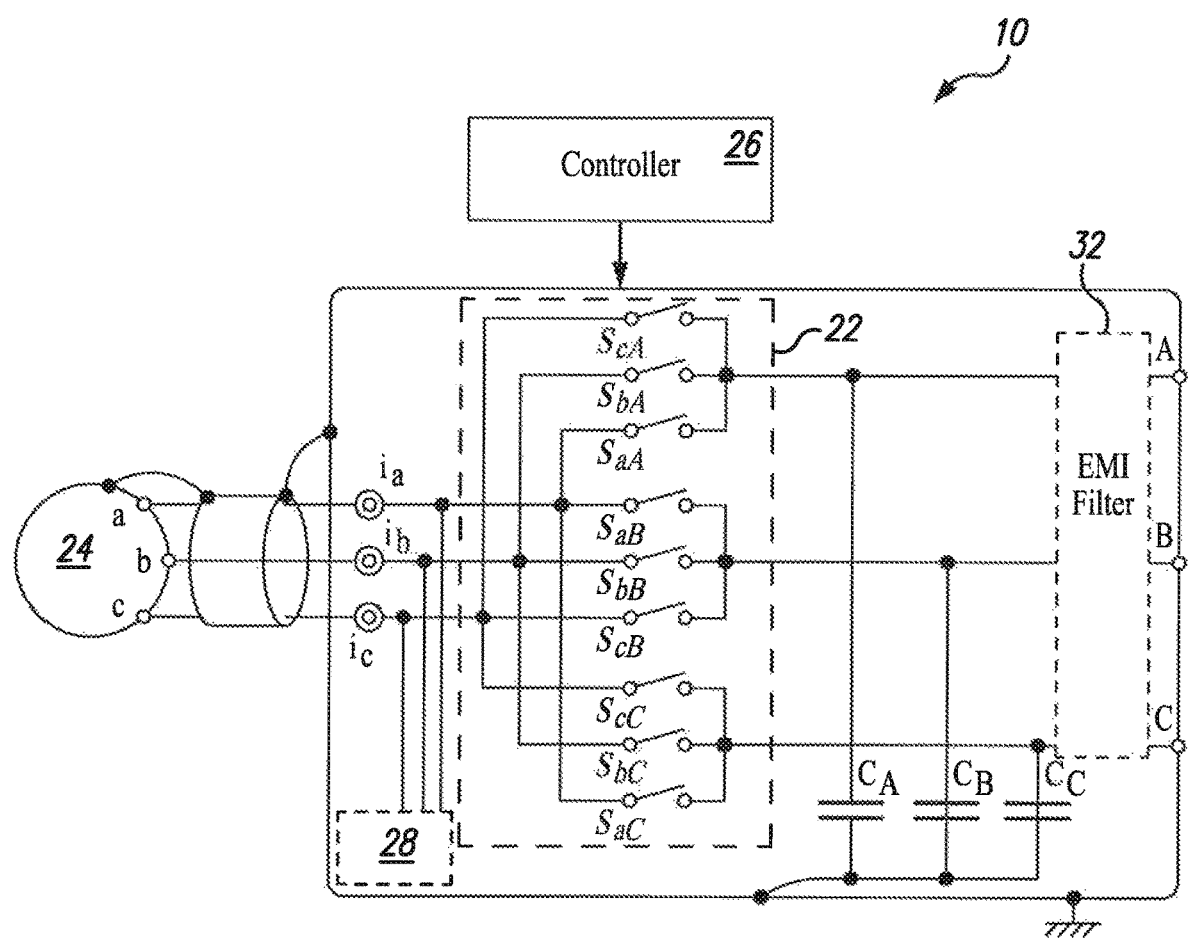
FIG. 1 is a circuit diagram illustrating an example matrix converter system that utilizes a current control mode in accordance with embodiments of the disclosure.

Reference will now be made to the drawings wherein like reference numerals identify similar structural features or aspects of the subject disclosure. For purposes of explanation and illustration, and not limitation, a block diagram of an exemplary embodiment of a matrix converter system in accordance with the disclosure is shown in FIG. 1 and is designated generally by reference character 10. Methods associated with operations of the matrix converter system 10 in accordance with the disclosure, or aspects thereof, are provided in FIGS. 2-11 as will be described. The systems and methods described herein can be used to provide improved control of a saturation level of (PWM for operation of a switch matrix in a matrix converter.

FIG. 1 is a circuit diagram illustrating matrix converter system 10 capable of operation in a current control mode (CCM). Matrix converter system 10 includes matrix converter 22 connected to receive input power from three-phase generator 24 on input phases (a, b, c). Matrix converter 22 include switches $S_{aA}$, $S_aB$, $S_{aC}$, $S_{bA}$, $S_{bB}$, $S_{bC}$, $S_{cA}$, $S_{cB}$, and $S_{cC}$ (hereinafter "$S_{aA}$-$S_{cC}$") that each receive control signals from controller 26. The switches of matrix converter 22 are controlled to convert input power on input phases (a, b, c) to output power on the output phases (A, B, C). Capacitors $C_A$, $C_B$, and $C_C$ are connected to the three respective output phases (A, B, C) of matrix converter 22. Damp circuit 28 (illustrated in further detail in FIG. 2C) is connected to the three phase inputs of matrix converter 22. Generator 24 is connected directly to matrix converter 22 through grounded sheath 30. An electromagnetic interference (EMI) filter 32 can be connected to the output of matrix converter 22 to provide further filtering for system 10. While illustrated as three input phases (a, b, c) and three output phases (A, B, C), any number of input phases and any number of output phases may be connected through matrix converter 22.

Matrix converter system 10 does not include inductors or capacitors at the input of matrix converter 22. By eliminating the capacitors at the input of matrix converter 22, the low impedance paths between phases (a, b, c) on the input side of matrix converter 22 are eliminated. The internal inductances of generator 24 create high impedances and thus, switches $S_{aA}$-$S_{cC}$ may be controlled such that phase-to-phase short circuits are created without the risk of generating damaging overcurrents. This allows system 10 to utilize the internal inductances of generator 24 to generate reactive currents, which can be utilized to charge output capacitors $C_A$, $C_B$, and $C_C$. This allows matrix converter system 10 to operate in a boost mode, generating currents to charge capacitors $C_A$, $C_B$, and $C_C$ even when the voltage on output phases (A, B, C) is relatively small. Thus, system 10 is able to overcome the 86.6% input-to-output voltage limit of matrix converter systems that operate in VCM mode only.

Controller 26 controls matrix converter 22 using a PWM control scheme. Controller 26 can be implemented using hardware, firmware, software, or a combination thereof. Controller 26 observes the current on input phases (a, b, c) and the voltage on output phases (A, B, C) to control matrix converter 22. Controller 26 may select a desired output frequency that is independent of the input frequency. For example, the output may be a three-phase AC output at a frequency greater than, or less than, that of generator 24. Generator 24 may also be a variable frequency generator, such that the frequency is at times greater than the output frequency, and at times less than the output frequency. The output frequency may also be selected to be zero, allowing for matrix converter 22 to generate a DC output from the AC input.

When the system is starting up, or if the voltage on the output phases (A, B, C) becomes relatively small, controller 26 may control matrix converter 22 in a boost mode in order to boost the voltage on output phases (A, B, C). To do this, controller 26 may control select switches $S_{aA}$-$S_{cC}$) to provide one or more short-circuit paths between input phases (a, b, c). These short-circuit paths rely on the high impedances created by the internal inductance of generator 24. During the short-circuit condition, energy is generated within the internal inductances of generator 24. After a selected time, switches ($S_{aA}$-$S_{cC}$) are controlled to remove the short circuit, and utilize the energy stored in the internal inductances of generator 24 to direct current to charge capacitors $C_A$, $C_B$, and $C_C$, which allows system 10 to create output voltages greater than the input voltages.

In contrast to system 10 that operates in the CCM mode, certain matrix converter systems that operate in a voltage control mode (VCM) are configured to provide an AC-AC voltage conversion that provides three-phase smooth voltage on the output phases. An input inductor-capacitor (LC) circuit is implemented at an input of the system's matrix converter. The input LC circuit generally includes capacitors connected between each phase of the input However, in certain applications, such as motor control applications, a motor can tolerate discontinuous voltages and therefore, motor windings can be directly connected to the output of such a matrix converter.

When operating in VCM, output voltage may be controlled and limited by the available input voltage. Due to the capacitors connected between the input and output phases, there exists a low impedance path between each input phase lines. Because of this, switches of this matrix converter cannot be controlled to provide a short circuit between any of the input phase lines. If a short circuit were created, the low impedance path created by these capacitors would create a large current, risking damage to the switches. Without any energy storage devices present in such a matrix converter to boost voltage during conversion, analysis has shown that operation of the matrix converter in VCM can only achieve, at best, 86.6% of the input voltage at the output.

Figure 2A:
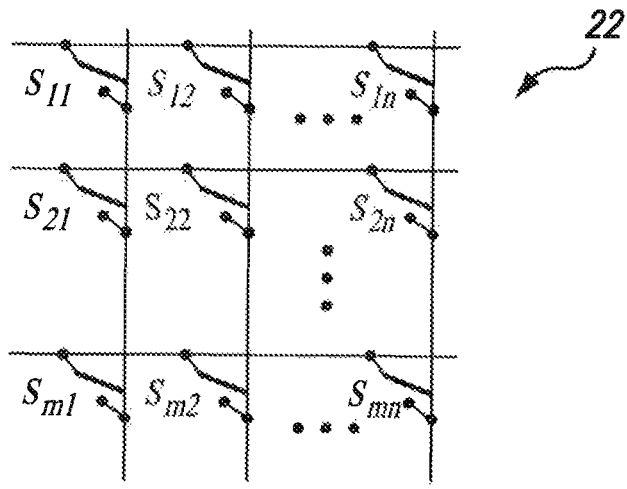
FIGS. 2A-2C are circuit diagrams illustrating an example switch matrix, an example bidirectional switch, and an example damping circuit, respectively, for the matrix converter system of FIG. 1.
Figure 2B:
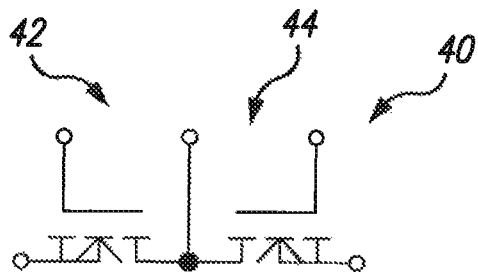

FIGS. 2A-2B are circuit diagrams illustrating a switch matrix for matrix converter 22, a bidirectional switch 40, and damp circuit 28, respectively. FIG. 2A illustrates an embodiment of matrix converter 22. As illustrated in FIG. 2A, matrix converter 22 may have any number (n) of input phases, and any number (m) of output phases. In the embodiment illustrated in FIG. 1, matrix converter has three input phases (n=3) and three output phases (m=3). As illustrated in FIG. 2A, matrix converter system 10 may be configured to generate any number of output phases from any number of input phases.

The matrix converter 22 is described by equations (A) and (B):

$$\boxed{\begin{aligned} S^T i_{abc} &= i_{ABC} \\ v_{abc} &= S v_{ABC} \end{aligned}} \quad (A)$$

$$\boxed{\begin{aligned} D^T \bar{i}_{abc} &= \bar{i}_{ABC} \\ \bar{v}_{abc} &= D v_{ABC} \end{aligned}} \quad (B)$$

where $S^T$ is a transposed switching matrix S that represents a switching value applied to each switch of the switch matrix of the matrix converter 22. When a high sampling rate and short sampling time $T_s$ is used, it can be assumed that input and output voltages and currents have negligible small changes and can be considered constant, such that switching matrix S can be replaced with duty cycle matrix D, as shown in Equations (A) and (B), where $\bar{v}_{doc}$ and $\bar{i}_{doc}$ are locally averaged values of $v_{doc}$ and $i_{doc}$.

FIG. 2B illustrates bidirectional switch 40. In prior art systems, matrix converters included bidirectional switches implemented using insulated gate bipolar transistors (IGBTs), for example. The use of IGBTs required the use of diodes to properly achieve bidirectional power flow. Bidirectional switch 40, in contrast, uses metal-oxide-semiconductor field-effect transistors (MOSFETs) 42 and 44, which may be silicon carbide (SiC) MOSFETs, for example. MOSFETs are channel devices that do not require the use of external diodes, as the internal channels of the MOSFET accomplish this task. Thus, bidirectional switch 40 may be accomplished by connecting the drains of MOSFETs 42 and 44. By using MOSFETs, the conduction loss of the bidirectional switch may be reduced.

Figure 2C:
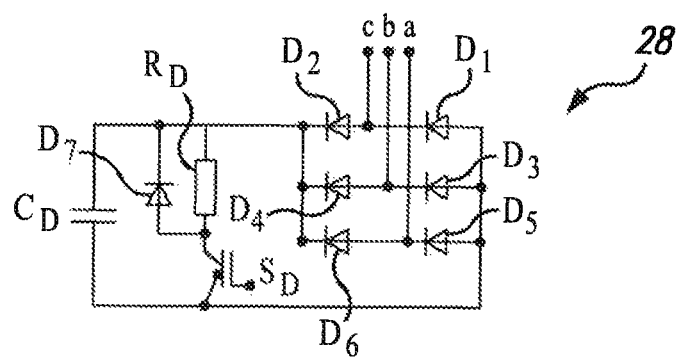

FIG. 2C illustrates an embodiment of damp circuit 28. As seen in FIG. 1, and in contrast to a matrix converter system that operates in VCM mode, damp circuit 28 is only connected to the input side of matrix converter 22. This is due to the absence of an LC circuit, in particular inductors of the LC circuit, provided at the input side of the matrix converter 22. Damp circuit 28 is configured such that if there is a disruption of current flow, the energy stored in the internal inductances of generator 24 has a path. Damp circuit 28 includes diodes $D_1$-$D_7$, capacitor $C_D$, resistor $R_D$, and switch $S_D$. Diodes D1-D6 form a rectifier circuit. The energy stored in the internal inductances of generator 24 upon shutdown of matrix converter 22, for example, flows through the rectifier circuit and charges capacitor $C_D$. Switch $S_D$ may then be controlled to discharge capacitor $C_D$ through resistor $R_D$.

Figure 3A:
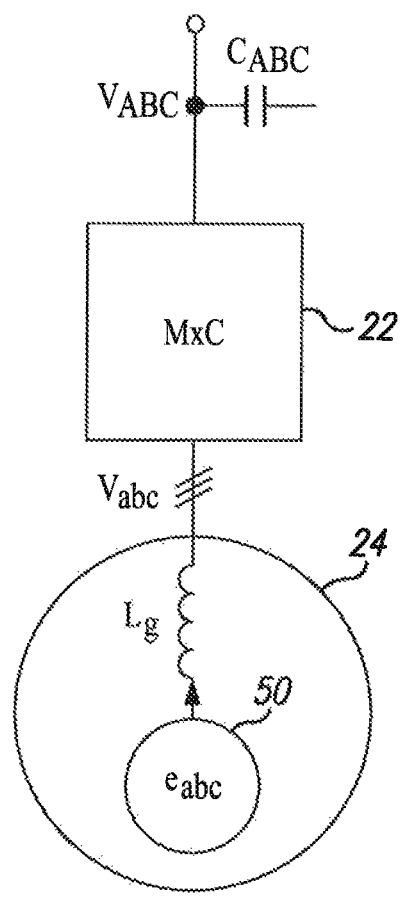
FIG. 3A is a line diagram illustrating a back electromotive force (EMF) of an example generator connected to an input of a matrix converter in accordance with embodiments of the disclosure.
Figure 3B:
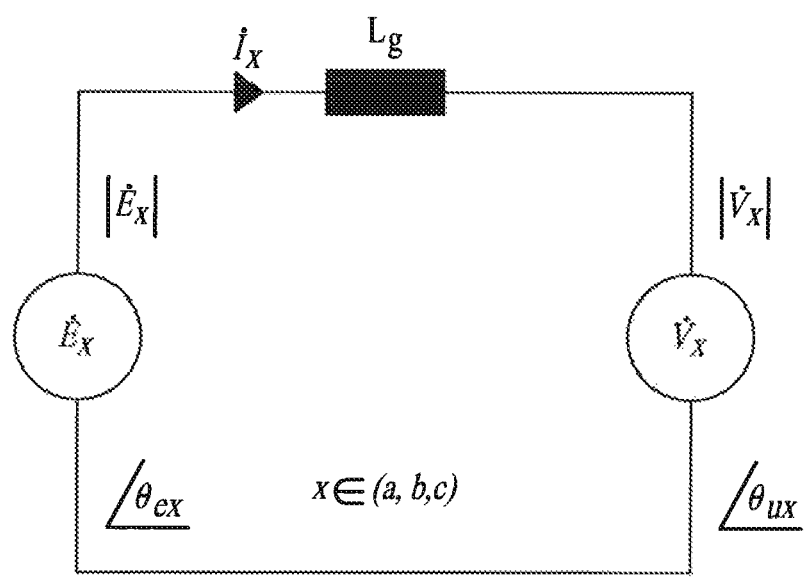
FIG. 3B is a line diagram illustrating a balance between the back EMF of a generator and an input voltage of an example matrix converter system in accordance with embodiments of the disclosure.
Figure 3C:
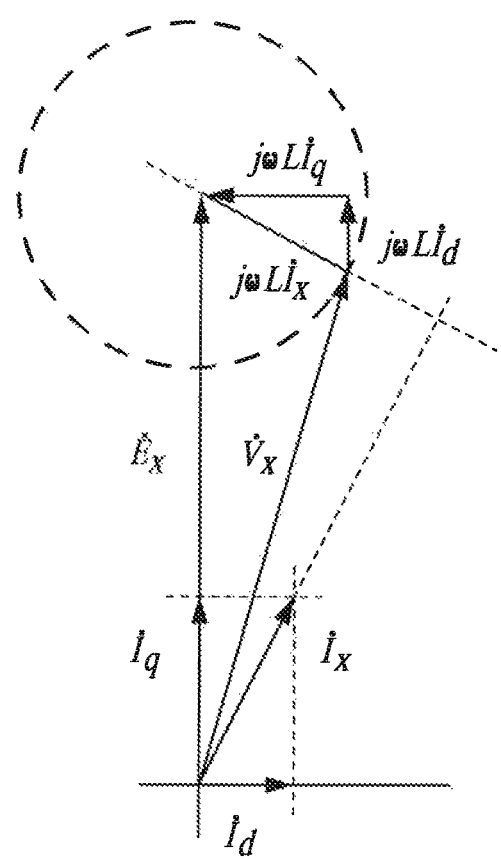
FIG. 3C is a phasor diagram illustrating vectors for back EMF voltage of an example generator, the voltage at the input to a matrix converter, and active and reactive currents from the generator in accordance with embodiments of the disclosure.

FIGS. 3A-3C are diagrams illustrating voltage and current relationships within system 10. FIG. 3A is a line diagram illustrating a back electromotive force (EMF) 50 of generator 24 connected to the input of matrix converter 22. FIG. 3B is a line diagram illustrating a balance between the back EMF voltage $E_x$ of generator 24 and input voltage $V_x$ to matrix converter 22. FIG. 3C is a phasor diagram illustrating vectors for back EMF voltage $\dot{E}_x$ of a generator, the voltage $V_x$ at the input to a matrix converter, and active $\dot{I}_q$ and reactive $\dot{I}_d$ currents from generator 24. FIGS. 3A-3C will be discussed together.

Generator 24 produces back EMF 50 ($e_{abc}$) and has internal inductances $L_G$. In accordance with the notation used with a subscript having multiple letters, a signal or component corresponds to each letter. Voltage ($v_{abc}$) at the output of generator 24 is provided to matrix converter 22. The voltage across capacitors $C_{ABC}$ ($v_{ABC}$) is the output voltage of matrix converter 22. For CCM, controller 26 operates to control input voltage ($v_{abc}$) to control current through matrix converter 22. This relationship is seen in FIG. 3B. $\dot{E}_x$ designates the voltage vector for the voltage of back EMF 50 ($e_{abc}$). $V_x$ designates the voltage vector for the input voltage ($v_{abc}$) to matrix converter 22. $\dot{I}_x$ designates the current vector for current flowing through internal inductances $L_g$. Thus, to control current flow in input phases (a, b, c), controller 26 may control the input voltage ($v_{abc}$). For example, if the input voltage vector $V_x$ is equal to the back EMF vector $\dot{E}_x$, no current will be flowing to the input of matrix converter 22.

FIG. 3C is a phasor diagram illustrating the relationship of the back EMF voltage ($e_{abc}$) and the input voltage ($v_{abc}$). FIG. 3C includes phasors $\dot{E}_x$, $\dot{V}_x$, and $\dot{I}_x$. $\dot{I}_x$ is the product of the active current phasor $\dot{I}_q$ and the reactive current phasor $\dot{I}_d$, which are 90° out of phase. The active current phasor $\dot{I}_q$ is in phase with the back EMF voltage $\dot{E}_x$. The voltage drop across the internal inductance $L_g$ (jωL$\dot{I}_x$) balances the input voltage $V_x$ with the back EMF voltage $\dot{E}_x$. The voltage drop across inductor $L_G$ (jωL$\dot{I}$x) is the result of the voltage drop due to the active current (jωL$\dot{I}_q$) and due to the reactive current (jωL$\dot{I}$d). Thus, as can be seen in FIGS. 3B and 3C, $\dot{V}_x$ can be controlled to control the current $\dot{I}_x$ to matrix converter 22. As seen in FIG. 3A, $v_{abc}$ can be controlled, in part, by controlling switch matrix 22 to connect $v_{ABC}$ on the output phases (A, B, C) to the input phases (a, b, c).

Figure 4:
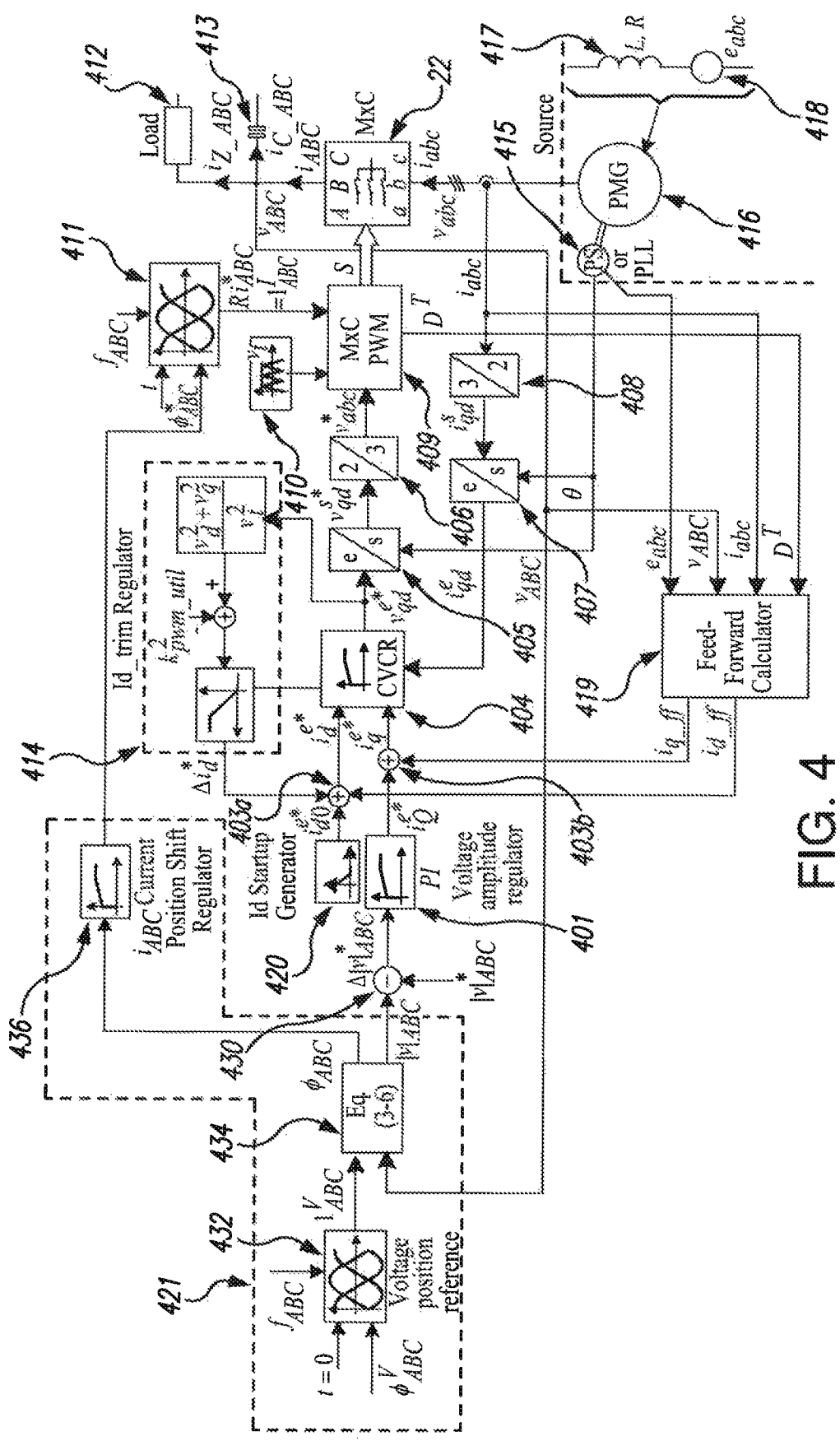
FIG. 4 is a block diagram illustrating an example matrix converter system that operates in a current control mode in accordance with embodiments of the disclosure.

FIG. 4 is a block diagram illustrating at least a portion of controller 26 for controlling matrix converter 22 using CCM in accordance with certain embodiments of controller 26. A generator 416 generates power that is provided to a load 412 via matrix converter 22. The load 412 can be unknown and/or variable. Control of matrix converter 22 by controller 26 is improved when alignment between $v_{ABC}$ and $i_{ABC}$ is maintained. With $v_{ABC}$ and $i_{ABC}$ aligned, voltage vector $v_{abc}$ can have the largest amplitude. Those skilled in the art will recognize that $v_{abc}$ is proportional to a modulation index of MxC 22, amplitude of $v_{ABC}$, and a phase angle between $v_{ABC}$ and $i_{ABC}$, and thus when vectors $v_{ABC}$ and $i_{ABC}$ are aligned, a vector having a maximized (e.g., largest possible) unity power factor offers the largest control action for controlling generator current. The switches ($S_{aA}$-$S_{cC}$) of matrix converter 22 are further controlled based on a reference voltage v*$_{ABC}$ provided to the matrix converter 22 as a reference voltage for $v_{ABC}$ to create and remove short-circuit paths within matrix converter 22. v*$_{ABC}$ can be internally generated, e.g., in an internal microprocessor or provided by an external system that controls MxC 22 as a subsystem.

Generator 416 provides an input voltage $v_{abc}$ to matrix converter 22. Generator 416, such as a permanent magnet generator (PMG), is a multiphase generator that includes internal inductances 417 of windings of generator 416. Generator 16 is similar in function and structure to generator 24 of FIG. 1. Generator 16 generates back EMF voltage $e_{abc}$ in its windings. The output of the matrix converter is provided to a three phase balanced load 412. The output voltage $v_{ABC}$ provided to the load 412 can be measured for each phase across capacitors 413, wherein capacitors 413 filter output voltage $v_{ABC}$.

Controller 26 includes a phase locked loop (PLL) alignment circuit 421, a PWM controller 409, a complex vector current regulator (CVCR) 404, a magnitude calculator 402, a unity current reference vector generator 411, a feed-forward calculator 419, an Id startup generator 420, a voltage regulator 401, current sensors 422, a 3:2 transform circuit 408, an observer 415, rotators 405 and 407, an Id_trim regulator 414, an active adder 403b, a reactive adder 403a, a triangle waveform generator 410, and a 2:3 transform circuit 406.

PWM controller 409 outputs control signals generated using pulse modulation to control switches $S_{aA}$-$S_{cC}$ (for $S_{ij}$, i=a-c and j-A-C, as shown in FIGS. 2-3C) of matrix converter 22. PWM controller 409 implements a matrix converter PWM algorithm such as, for example, space-vector control with triangle comparison, or any other PWM algorithm for matrix converter 22. An example PWM controller is described in U.S. Pat. No. 8,259,474 to Vladimir Blasko, published Feb. 24, 2011.

In the example shown, the PWM controller 409 receives a triangle waveform from triangle waveform generator 410 and a unity current reference vector $\mathbf{1}^I_{ABC}$ from unity current reference vector generator 411 for implementing space-vector control with triangle comparison. The unity current reference vector generator 411 receives reference phase angle $\Phi^*_{ABC}$ from the PLL alignment circuit 421. The unity current reference vector $\mathbf{1}^I_{ABC}$ generated by unity current reference vector generator 411 defines the position of current phasor/vector $\dot{I}_{ABC}$ that is corrected by the reference phase angle $\phi^*_{ABC}$ to adjust a vector $\dot{V}_{ABC}$ representing the output voltage to have a desired position/angle to be aligned with a unity voltage reference vector $\mathbf{1}^V_{ABC}$ generated by PLL alignment circuit 421. The reference phase angle $\phi^*_{ABC}$ is used to adjust the vector representing the output voltage $\dot{V}_{ABC}$ to be aligned with the unity voltage reference vector $\mathbf{1}^V_{ABC}$ in the presence of load 412, even when the load 412 is unknown and/or is changing.

The controller 26 includes a feed forward calculator 419 that estimates feed forward current and feed forward load angle, which assist to control a saturation level of PWM controller 409 for operation of the switch matrix of matrix converter 22. Saturation of the PWM controller 409 can occur when the output voltage ($v_{ABC}$) has become small compared to the input voltage ($v_{abc}$) due to an inability of the PWM algorithm to control the input voltage ($v_{abc}$) using the small output voltage ($v_{ABC}$). Saturation can be mitigated by controlling matrix converter 22 to generate some reactive current in generator 416 to reduce the demand on the voltage $v_{abc}$ to minimize the possibility of saturation, including to pull the PWM algorithm out of saturation, in other words to avoid saturation during PWM control.

Feed forward calculator 419 receives output voltage $V_{ABC}$, back EMF $e_{abc}$, sensed current $i_{abc}$, and the matrix converter's 22 $D^T$, and outputs feed forward q and d current components $i^e_{qd\_ff}$.

The feed forward q and d current components $i_{qd\_ff}$ (also referred to as $i_{q\_ff}$ and $i_{d\_ff}$) are provided, respectively, to active adder 403b and reactive adder 403a, which each apply a function to the respective and feed forward q and d current components $i_{qd\_ff}$. As described below, output of the respective active and reactive adders 403b and 403a are provided as active and reactive current reference signals $i^{e*}_q$ and $i^{e*}_d$ to the CVCR 404. The active and reactive current reference signals $i^{e*}_q$ and $i^{e*}_d$ are configured to control power transfer from low voltage (denoted abc) to high voltage (denoted ABC), also referred to as low and high sides, respectively.

With reference to generation of the reactive current reference $i_d^{e*}$ that is provided to the CVCR 40, Id startup generator 420 operates during startup time when the output voltage $v_{ABC}$ is still forming and has an amplitude significantly below reference value to generate an initial reactive current reference $i^{e*}_{d0}$. Id startup generator 420 increases or initializes the initial reactive current reference $i^{e*}_{d0}$ at startup, e.g., as 1 to 1 per unit (pu) value, for a predetermined time interval that is a fraction of a period of the output voltage waveform. Then Id startup generator 420 gradually ramps down the initial reactive current reference $i^{e*}_{d0}$, e.g., to zero, after the predetermined time interval. The ramp down can occur, for example, over a 5 to 10 ms time span.

At light load or no load, there is a need for substantial reactive id current to have regulators operational and the PWM controller 409 in a non-saturated region. Once after startup when a grid is formed or there is a weak grid or parallel unit running and able to provide loading or reactive power for a capacitor bank (i.e., a small capacitor bank having three capacitors) at the output, the matrix converter 22 becomes fully controllable.

The initial reactive current reference $i^{e*}_{d0}$ output by the Id startup generator 420 is combined at reactive adder 403a with feed forward d current component $i^e_{d\_ff}$ from the feed forward circuit 419 and $\Delta i^e_d$ output from Id_trim regulator 414, wherein Id_trim regulator 414 is described further below. The output of the reactive adder 403a is the reactive current reference $i^{e*}_d$, which is provided to the CVCR 404.

With reference to generation of the active current reference $i_q^{e*}$ that is provided to the CVCR 404, voltage regulator 401 creates a regulated active current signal $i^{e*}_Q$. Voltage regulator 401 is a proportional integral (PI) output voltage magnitude regulator that uses a PI method to regulate magnitude of the output voltage. As is known to those having skill in the art, PI regulators consist of a proportional part and an integral part. The proportional part multiplies error signal with a proportional gain. The integral part integrates an error input signal with an integral gain. Due to integral action, the PI regulator eliminates steady state DC error from the input signal.

It is noted that in phasor notation active power brought to ABC from abc side is proportional to the product of phasor $\dot{E}_{abc}=E_q$ which is phase current $\dot{I}_{abc}=I_q$ in a phasor notation. In vector notation the power transfer is a product of vector components $e_q^e i_q^e$, in synchronous reference frame when aligned with q axis and $e_d^e=0$.

In the example embodiment shown, PWM controller 409 receives a triangle waveform from triangle waveform generator 410 to implement a switching matrix S with switching pulses for turning on and off switches in a power stage of matrix converter 22. Matrix converter 22 can further receive a unity current reference vector from unity current reference vector generator 411, which uses three cosine functions with unity amplitude 120 degrees apart for defining position angle $\Theta_{ABC}$ and frequency $f_{ABC}$ of locally averaged current $i_{ABC}$ at the output of matrix converter 22.

With reference to application of the phase reference angle $\phi^*_{ABC}$, in the example embodiment shown, PWM controller 409 receives a triangle waveform from triangle waveform generator 410 to implement a switching matrix S with switching pulses for turning on and off switches in a power stage of matrix converter 22. Matrix converter 22 can further receive a unity current reference vector $1^l_{ABC}$ from unity current reference vector generator 411, which uses three cosine functions with unity amplitude 120 degrees apart for defining position angle $\Theta_{ABC}$ and frequency $f_{ABC}$ of locally averaged current $i_{ABC}\delta\delta$ at the output of matrix converter 22. Locally averaged values of variables, like fast changing current or voltages, are averaged values over short sampling interval that can be considered to be constant over short sampling intervals. The sampling time can be related to a period of switching of devices in a power circuit of a matrix converter. Unity current reference vector generator 411 receives phase reference angle $\phi^*_{ABC}$ and the frequency $f_{ABC}$ of $i_{ABC}$ and applies equations for determining unity current for each phase at a time t as shown in Equations (1):

$$1^l_A = \cos(2\pi f_{ABC} t - 0 - \phi^*_{ABC}) \quad (1)$$
$$1^l_B = \cos\left(2\pi f_{ABC} t - \frac{2\pi}{3} - \phi^*_{ABC}\right)$$
$$1^l_C = \cos\left(2\pi f_{ABC} t - \frac{4\pi}{3} - \phi^*_{ABC}\right)$$

The input voltage ($v_{abc}$) of matrix converter 22 is sampled at the output of generator 416 and provided to observer 415. Current ($i_{abc}$) is sampled by current sensors 422 at the output of generator 416 and provided to observer 415, feed forward calculator 419, and 3:2 transform circuit 408.

Observer 415 is a circuit capable of determining a reference angle θ. The observer 415 can include, for example, a position sensor (e.g., a resolver on a shaft of the generator 416) to determine an angular position ($\theta_{abc}$) of a rotor of generator 416 based upon the sampled voltage ($v_{abc}$) and current ($i_{abc}$), and thus the position of generated voltage e (back EMF) in the generator. In embodiments, observer 415 includes a phase locked loop (PLL) from voltage source $e_{abc}$ if a separate voltage source is used.

3:2 transform circuit 408 performs an abc-to-dq transformation to convert the three-phase AC signal into two-phase AC signal ($i^s_q$ and $i^s_d$). The block 407 performs a rotational transformation on the two-phase AC signal ($i^s_q$ and $i^s_d$), creating from them DC-like signals ($i^e_q$ and $i^e_d$, hereinafter referred to as "static DC signals").

Controller 26 receives a reference voltage vector $v^*_{ABC}$ having magnitude $|v|^*_{ABC}$ that represents the amplitude of a desired output voltage ($v_{ABC}$). The output voltage magnitude ($|v|ABC$) is provided to adder 430 that determines the difference between $|v|^*_{ABC}$ and a voltage magnitude $|V|_{ABC}$ output by the phase locked loop (PLL) alignment circuit 421. The difference, $\Delta|v|_{ABC}$ is input to the voltage regulator 401. Using the difference, $\Delta|v|_{ABC}$ voltage regulator 401 generates a current signal ($i_e^q$) that is indicative of the difference between the output voltage magnitude (v) and the difference between $|v|^*_{ABC}$. Because active current ($i_q$) is in phase with the back EMF voltage of generator 416, the output of voltage regulator 401 is a regulated active current signal $i^{e*}_Q$. As previously described, the regulated active current signal $i^{e*}_Q$ output by voltage regulator 401 is combined at active adder 403b with feed forward q current component $i_{q\_ff}$ to modify the regulated active current signal $i^{e*}_Q$ into active reference current signal $i_q^{e*}$, which is provided to the active current regulator in CVCR 404, which includes active (q) and reactive (d) current regulators.

The output of CVCR 404, components $v_d$ and $v_q$ are introduced into PWM controller 409 through rotator 405, and then through 2:3 transform circuit 406, as a three phase signal voltage reference signal $v^*_{abc}$. The three phase voltage reference signal $v^*_{abc}$ is after zero sequence injection, compared with triangle waveform signal $v_t$ and should not exceed its amplitude in order to avoid PWM saturation. While voltage reference signal $v^*_{abc}$ is transformed from $v^{e*}_{qd}$, the $v^{e*}_{qd}$ signal is input to Id_trim regulator 414, wherein the output signal of the Id_trim regulator 414 is indicative of saturation of the PWM algorithm. Id_trim regulator 414 is configured to output a control signal ($\Delta id^*$) indicative of a desired change in reactive current, wherein ($\Delta id^*$) is used to avoid saturation of the PWM controller 409 by reducing demand on voltage $v_{abc}$ which is proportional to voltage reference signal $v^*_{abc}$ and consequently to $v^{e*}_{qd}$ Reactive adder 403a is used to adjust the reactive current control signal (id$^{e*}$) based on the desired change in reactive current ($\Delta id^*$) from Id_trim regulator 414 and feed forward reactive current $i^{e*}_{d\_ff}$. The output of reactive adder 403a is provided to CVCR 404. Active adder 403b is used to adjust the regulated active current signal ($i^{e*}_Q$) output by voltage regulator 401 based on feed forward active current $i^{e*}_{q\_ff}$. The output of active adder 403b is also provided to CVCR 404.

CVCR 404 includes regulators for regulating active current ($i^e_q$) and reactive current ($i^e_d$), implemented in a synchronous—rotating reference frame received output from rotator 407 using the respective active and reactive current control signals output by active adder 403b and reactive adder 403a. Thus, in embodiments, currents $i^e_q$ and $i^e_d$ can be regulated by separate synchronous reference frame q and d regulators. CVCR 404 can be viewed as an improved version of q and d separate regulators with inherent cross coupling as known to these familiar with theory of operation of CVCR. CVCR regulator 404 generates a voltage indicative of a difference between the regulated active and reactive current feedback ($i^e_q$, $i^e_d$, respectively) and provides the voltage $v^{e*}_{qd}$ to rotator 405.

Rotator 405 receives the two DC like voltages, components $v_d$ and $v_q$, from CVCR 404. Rotator 405 also receives a control angular position ($\theta_{abc}$). Controller 26 uses the control angular position ($\theta_{abc}$) to control the frequency of the voltage ($v_{abc}$). Rotator 405 converts the two DC like voltages, components $v_d$ and $v_q$, and provides $v_d$ and $v_q$ to 2:3 transform circuit 406. 2:3 transform circuit 406 performs a $d^s q^s$-to-abc transformation on the two ac voltages in $d^s q^s$ stationary reference frame to generate three-phase signals $v_{abc}$ for PWM controller 409. PWM controller 409 then uses the three-phase signals $v_{abc}$ to control matrix converter 22. The superscript s represents a stationary reference frame, wherein signals in a stationary frame are AC sinusoidal signals and signals in a rotating frame are steady DC-like signals.

Matrix converter system 10 has several advantages over a matrix converter that operates in the VCM mode. By controlling matrix converter system 10 using CCM, the input LC circuit may be removed, and output voltage can be filtered by only additional three capacitors, one per phase. This reduces the size and weight of the matrix converter system. Matrix converter system 10 is also able to operate in a boost mode, allowing voltage operation at the output above 86.6% of the input voltage (the generator's 416 back EMF) which has been a major drawback in previous matrix converter system design.

In operation, CVCR 404, regulates $i^e_q$ and $i^e_d$ current components to follow current references $i^{e*}_q$ and $i^{e*}_d$. Output of CVCR 404 is a voltage vector $v^{e*}_{qd}$, which after transformation into stationary reference frame and into abc coordinates by 2:3 transform circuit 406, becomes $v^*_{abc}$. $v^*_{abc}$ is a modulation input into PWM controller 409, which creates $v_{abc}$ on a low-voltage side from available voltage on high-voltage side, namely $v_{ABC} \cos \Theta_{ABC}$. Thus voltage $v_{abc}$ is proportional to the modulation voltage $v^*_{abc}$ and $v_{ABC} \cos \Theta_{ABC}$. Thus, the load power factor has an impact on available voltage and control of source current on the low-voltage side.

Operation with feed forward q and d current components $i^{e*}_{q\_ff}$ and identification of a load angle δ is now described. Feed forward values of $I_q$ and $I_d$ current are calculated based on power demand at output of matrix controller 22 and also based on a need for reactive $I_d$ current component to provide an amount of voltage to still maintain PWM controller 409 below saturation level, having modulation index m<1. Modulation index is the ratio between amplitude of voltage reference signal $v^*_{abc}$ and peak value of triangle waveform from block 410.

With reference to components of PLL alignment circuit 421, which calculates the phase reference angle $|\Phi_{ABC}$. PLL alignment circuit 421 includes a voltage position reference generator 432, an analytic calculator 434, and a current position shift PI regulator 436.

The voltage position reference generator 432 is similar to unity current reference vector generator 411. The voltage position reference generator 432 receives an input phase angle $\Theta^V_{ABC}=0$ and the frequency $f_{ABC}$ of $i_{ABC}$, and applies equations for determining unity voltage for each phase at a time t as shown in Equations (2), wherein the term $\Phi^V_{ABC}=0$:

$$1^V_A = \cos(2\pi f_{ABC}t - 0) \quad (2)$$
$$1^V_B = \cos\left(2\pi f_{ABC}t - \frac{2\pi}{3}\right)$$
$$1^V_C = \cos\left(2\pi f_{ABC}t - \frac{4\pi}{3}\right)$$

The analytic calculator 434 applies Equations (3)-(6):

$$V_{ABC} = |V_{ABC}| = \sqrt{\frac{2}{3}(v_A^2 + v_B^2 + v_C^2)} \quad (3)$$

$$p_c = (v_A 1^V_A + v_B 1^V_B + v_C 1^V_C) \quad (4)$$

$$q_c = \frac{1}{\sqrt{3}}[(v_B - v_C)1^V_A + (v_C - v_A)1^V_B + (v_A - v_B)1^V_C] \quad (5)$$

$$\phi_{ABC} = \mathrm{atan}\left(\frac{q_c}{p_c}\right) \quad (6)$$

Equations (4)-(6) are applied for determining $\Phi_{ABC}$ which is provided to current position shift PI regulator 436. The current position shift PI regulator 436 conditions $\Phi_{ABC}$ and generates a modified reference angle $\Phi^*_{ABC}$ which is supplied to unity current reference vector generator 411 to generate $1^I_{ABC}$. Voltage vector $v_{ABC}$ is aligned with unity voltage reference vector $1^V_{ABC}$ by shifting unity current reference vector $1^I_{ABC}$ using modified reference angle $\Phi^*_{ABC}$. The shift of the unity current reference vector $1^I_{ABC}$ moves the output current vector $i_{ABC}$ into a position that for a given load 412 provides a desired voltage alignment within a single period of the output current $i_{ABC}$ output by the matrix converter. One skilled in the art will recognize that PLL alignment circuit 421 can quickly adjust the modified reference angle $\Phi^*_{ABC}$ to cause the desired alignment without using feed forward values calculated by the feed-forward calculator.

Equation (3) is applied to the feedback voltage vector $v_{ABC}$ to determine magnitude of $v_{ABC}$, which is used to determine regulated active current $i^e_Q$, which is input to active adder 403b. In particular, the magnitude of $v_{ABC}$ output by Equation (3) is provided to differential adder 430 to determine difference, $\Delta|V|_{ABC}$, which is provided to voltage regulator 401 for determining regulated active current $i^e_Q$, which is provided to active adder 403b to be used for computation of active current reference $i^{e*}_q$, which is provided to CVCR 404. In other words, in this embodiment, the output of Equation (3) is used for eventually determining the active current reference $i^{e*}_q$ provided to CVCR 404.

Figure 5:
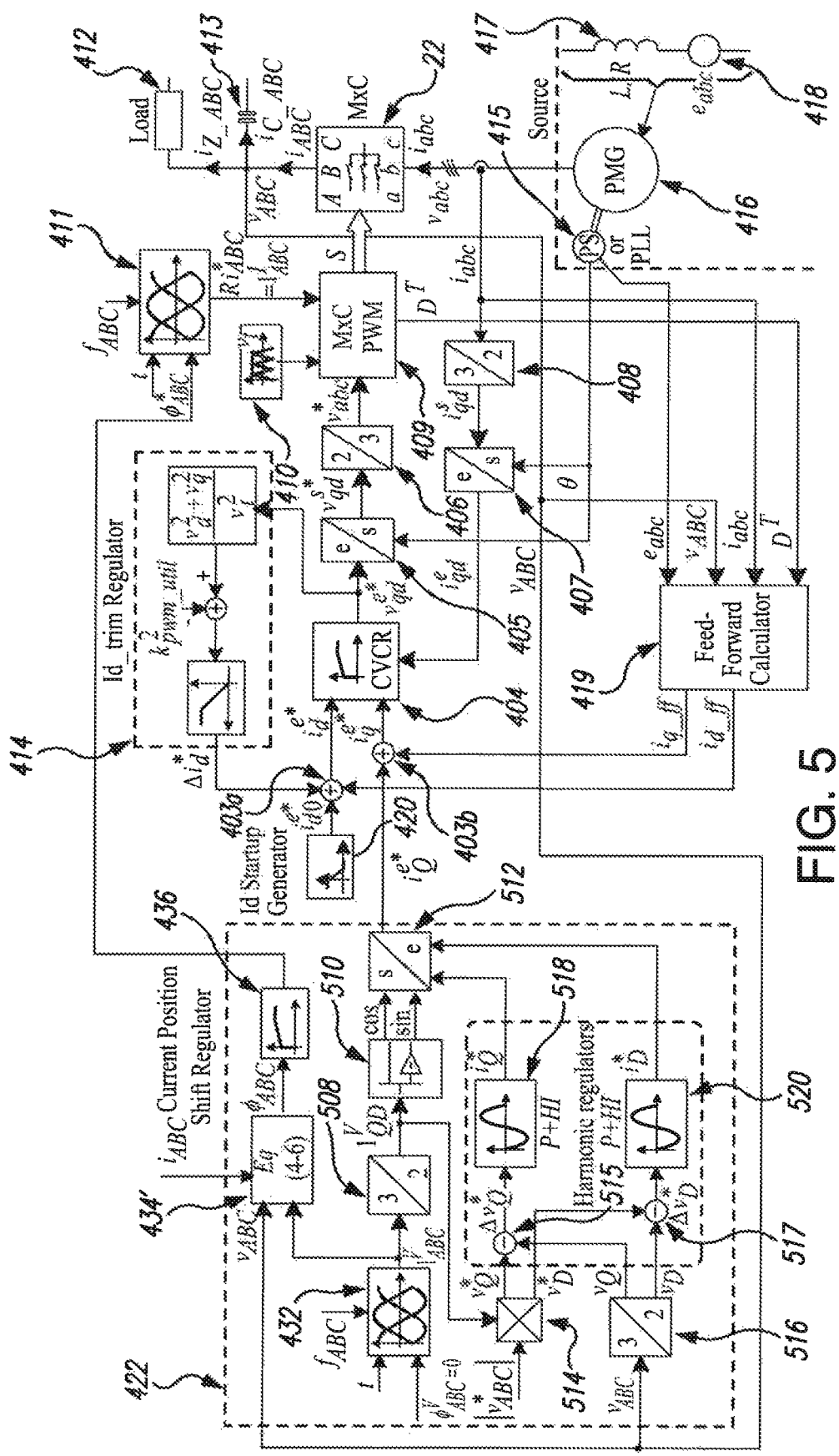
FIG. 5 is a block diagram illustrating another embodiment of an example matrix converter system that operates in a current control mode in accordance with embodiments of the disclosure.

With reference to FIG. 5, a control block 422 with harmonic regulators 518 and 520 circuit 422 is provided in place of PLL alignment circuit 421. Similar to the PLL alignment circuit 421, control block 422 calculates the phase reference angle $\Phi^*_{ABC}$ using PLL action provided by voltage position reference generator 432, a modified analytic calculator 434' that applies Equations (4)-(6), and current position shift PI regulator 436.

Modified analytic calculator 434' differs from analytic calculator 434 in that it does not apply Equation (3), but rather controls amplitude of feedback voltage vector $v_{ABC}$ using a stationary reference frame with harmonic regulators 518 and 520, instead of Equation (3), to output signals that are used for eventual determination of the active current reference $i^{e*}_q$ provided to CVCR 404. As described in greater detail below, harmonic regulators 518 and 520 apply individual control of Q and D vector components of current references $i_D^*$ and $i_Q^*$.

The control block 422 further includes 3:2 transform circuits 508 and 516, rotators 512, a sine/cosine derivation component 510, a multiplier 514, differential adders 515 and 517, and Q and D harmonic regulators 518 and 520, respectively. Rotator 508 receives unity voltage reference vector $1^V_{ABC}$ from voltage position reference generator 432 and converts it to QD components as $1^V_{QD}$, which is provided to sine/cosine derivation component 510 and multiplier 514.

Sine/cosine derivation component 510 receives $1^V_{QD}$ and derives corresponding cosine and sine functions from the three-phase reference unit vector as converted into Q and D components, providing the cosine and sine functions to rotator 512.

Multiplier 514 receives and determines a product of unity voltage reference vector $1^V_{QD}$ and the magnitude of reference voltage $|v|^*_{ABC}$, and outputs the resulting product as reference voltage components $v^*_Q$ and $v^*_D$. 3:2 transform circuit 516 receives feedback voltage vector $v_{ABC}$ and outputs $v_Q$ and $v_D$. Reference voltage components $v^*_Q$ and $v^*_D$ control feedback voltage vector components $v_Q$ and $v_D$. Differential adder 515 determines the difference between $v^*_Q$ and $v_Q$ and outputs $\Delta v^*_Q$. Differential adder 517 determines the difference between $v^*_D$ and $v_D$ and outputs error signals $\Delta v^*_D$. Error signal $\Delta v^*_Q$ is provided to Q harmonic regulator 518, and error signal $\Delta v^*_D$ is provided to D harmonic regulator 520. The Q and D harmonic regulators 518 and 520 each operate individually on the error signal received to apply a transfer function shown in Equation (7):

$$G_{HR} = K_P + K_I \frac{s}{s^2 + \omega^2}; \omega = 2\pi f_{ABC} \tag{7}$$

The transfer function $G_{HR}$ defined by Equation (7) is applied to the received error signal, using proportional gain $K_p$ and providing integration of a harmonic component with resonant frequency $\omega$ and integral gain $K_I$. As will be recognized by one skilled in the art, "s" denotes a complex Laplace variable "s."

The property of harmonic regulators is to be able to keep steady state error of a periodic component with resonant frequency equal to zero, which keeps alignment of reference and feedback voltage vectors. Error signals $\Delta v^*_Q$ and $\Delta v^*_D$ are introduced into Q and D harmonic regulators 518 and 520, respectively. Outputs from harmonic regulators 518 and 520 are transformed from stationary to synchronous reference frame by rotator 512 using the cosine and sine functions output by Sine/cosine derivation component 510, and output as regulated active current $i^{e*}_Q$, which is representative of the active power demand from low to high voltage side. Regulated active current $i^{e*}_Q$ is input to active adder 403b as a reference for q component of current on a low voltage side. The active current reference $i^{e*}_q$ output from active adder 403b is provided to CVCR 404.

Figure 6:
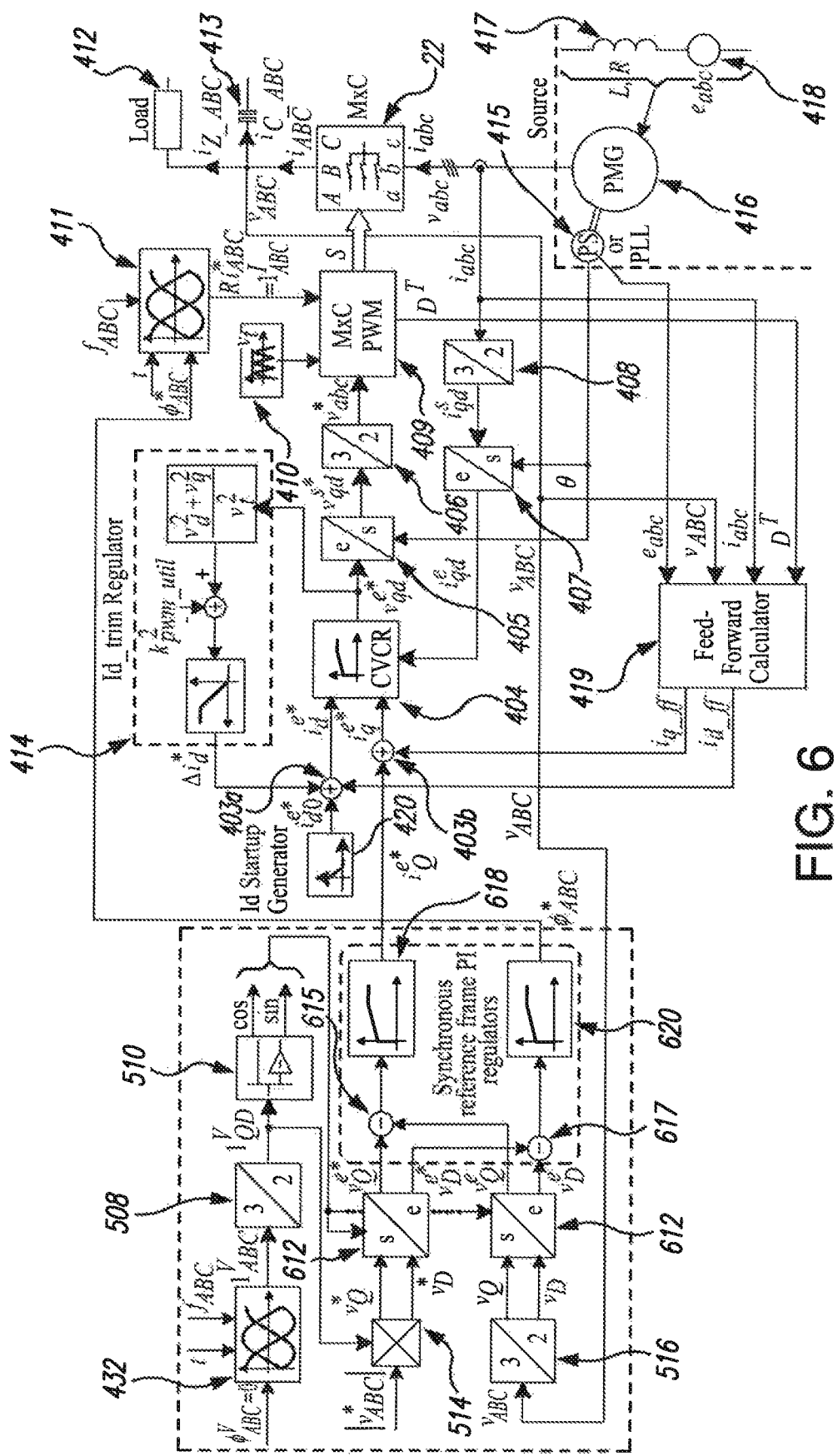
FIG. 6 is a block diagram illustrating a further embodiment of an example matrix converter system that operates in a current control mode in accordance with embodiments of the disclosure.

With reference to FIG. 6, a synchronous reference frame regulator circuit 423 is provided in place of PLL alignment circuit 421 or harmonic regulator circuit 422. Unlike the PLL alignment circuit 421, synchronous reference frame regulator circuit 423 calculates the phase reference angle $\Theta^*_{ABC}$ using output of a D regulator 614.

Synchronous reference frame regulator circuit 423 includes voltage position reference generator 432, 3:2 transform circuits 508 and 516, sine/cosine derivation component 510, multiplier 514, rotators 612, Q differential adders 615, D differential adder 617, and Q and D regulators 618 and 620, respectively.

The voltage position reference generator 432 receives an input phase angle $\Theta^V_{ABC}=0$ and the frequency $f_{ABC}$ of $i_{ABC}$, and applies Equations (2) for determining unity voltage $1^V_{ABC}$ for each phase at a time t. Rotator 508 receives unity voltage reference vector $1^V_{ABC}$ from voltage position reference generator 432 and converts it to QD components as $1^V_{QD}$, which is provided to sine/cosine derivation component 510 and multiplier 514.

Multiplier 514 receives and determines a product of unity voltage reference vector $1^V_{QD}$ and the magnitude of reference voltage $|v|^*_{ABC}$, and outputs the resulting product at reference voltage components $v^*_Q$ and $v^*_D$. 3:2 transform circuit 516 receives feedback voltage vector $v_{ABC}$ and outputs $v_Q$ and $v_D$. Reference voltage components $v^*_Q$ and $v^*_D$. control feedback voltage vector components $v_Q$ and $v_D$.

Reference voltage components $v^*_Q$ and $v^*_D$ are received by stationary to synchronous reference frame rotator 612 and transformed from the stationary reference frame to the synchronous reference frame as $v^{e*}_Q$ and $v^{e*}_D$, respectively, using the cosine and sine functions output by sine/cosine derivation component 510.

Control feedback voltage components $v_Q$ and $v_D$ are received by stationary to a second synchronous reference frame rotator 612 and transformed from the stationary reference frame to the synchronous reference frame as $v^e_Q$ and $v^e_D$, respectively, using the cosine and sine functions output by sine/cosine derivation component 510.

Q differential adder 615 determines the difference between active reference voltage component $v^*_Q$ and active control feedback voltage component $v_Q$ and provides the difference as an active error signal to Q regulator 618. D differential adder 617 determines the difference between reactive reference voltage component $v^*_D$ and reactive control feedback voltage component $v_D$ and provides the difference as a reactive error signal to D regulator 620.

The Q regulator 618 and the D regulator 620 are synchronous reference frame PI regulators. The Q regulator 618 operates on the active error signal to output the active regulated current signal $i^{e*}_Q$ that is then input to adder 403b. Regulated active current $i^{e*}_Q$, is representative of the active power demand from low to high voltage side. Regulated active current $i^{e*}_Q$ is input to active adder 403b as a reference for the active q component of current on the low voltage side. The active current reference $i^{e*}_q$ output from active adder 403b is provided to CVCR 404. Voltage regulators control voltage by acting on the active current and thus bringing or removing energy to/from the system. Therefore outputs of Q voltage regulator 618 is connected and creates a reference for a current regulator, namely CVCR 404, and controls current and power or energy flow in or out of the matrix converter system.

The D regulator 620 operates on the reactive error signal to output the reference phase angle $\Phi^*_{ABC}$ that is then input to unity current reference vector generator 411. Regulator 620 adjusts the position of output current vector $i_{ABC}$ and thus, for a given load, also adjusts the position of output voltage vector $v_{ABC}$, driving, at the same time, the reactive error signal at its input towards zero. Thus, the output of D regulator shifts phase angle of the unity current reference vector $1^I_{ABC}$ that defines position of the feedback current vector. $i_{ABC}$. When there is perfect alignment of $v_{abc}$ with $1^V_{ABC}$, $v^e_Q=|v|_{ABC}$ and $v^e_D=0$. Voltage $v^e_D$ is proportional to the sine of phase error between unity current reference vector $1^I_{ABC}$ and feedback voltage vector $v_{ABC}$ and its magnitude $|v|_{ABC}$, as indicated in Equation (8), wherein phase error signal ε is defined in Equation (9):

$$v_D^e = |V_{ABC}|\sin(\phi_{ABC}^* - \phi_{ABC}) \tag{8}$$

$$\varepsilon = (\phi_{ABC}^* - \phi_{ABC}) \approx k[|V_{ABC}|\sin(\phi_{ABC}^* - \phi_{ABC})] \tag{9}$$

Thus, for a small phase error signal and steady output voltage $v_{abc}$ there is a nearly linear relationship between $v^e_D$ and angle error ε, which provides for a convenient method for controlling phase angle. The method has dynamic properties for angle tracking and enables individual control of Q and D voltage components. The control is provided very fast and provides, due to integral actions in synchronous PI regulators 618 and 620 maximized eliminations of DC/steady state components in error signals. Experimental results demonstrate that this elimination of the DC/steady state components can be a complete elimination.

Aspects of the present disclosure are described above with reference to block diagrams of methods, apparatus (systems) and computer program products according to embodiments of the disclosure. Features of the methods described include operations, such as equations, transformations, conversions, etc., that can be performed using software, hardware, and/or firmware. Regarding software implementations, it will be understood that individual blocks of the block diagram illustrations and combinations of blocks in the block diagram illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block diagram block or blocks.

Figure 7:
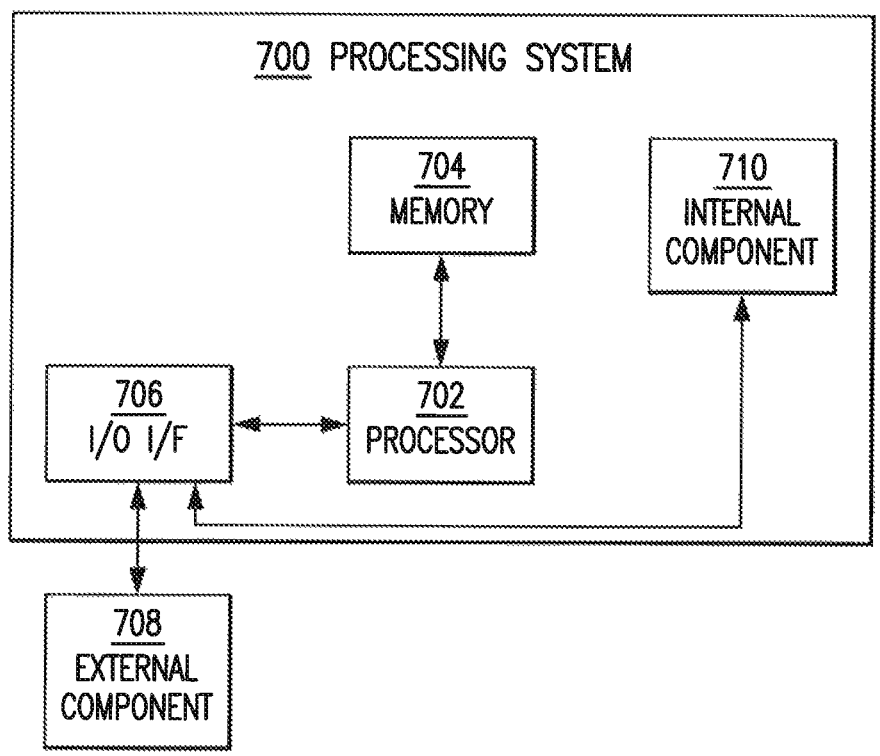
FIG. 7 is a block diagram of an exemplary computer system configured to implement components of a controller of the matrix converter system of FIG. 1

With reference to FIG. 7, a block diagram of an example computing system 700 is shown, which provides an example configuration of the controller 26 or one or more portions of the controller 26. Computing system 700 is only one example of a suitable system and is not intended to suggest any limitation as to the scope of use or functionality of embodiments of the disclosure described herein. Computing system 700 can be implemented using hardware, software, and/or firmware. Regardless, computing system 700 is capable of being implemented and/or performing functionality as set forth in the disclosure.

Computing system 700 is shown in the form of a general-purpose computing device. Computing system 700 includes a processing device 702, memory 704, an input/output (I/O) interface (I/F) 706 that can communicate with an internal component 710, and optionally an external component 708.

The processing device 702 can include, for example, a programmable logic device (PLOD), microprocessor, digital signal processor (DSP), a microcontroller, a field programmable gate array (FPGA), an application specific integrated circuit (ASCI), and/or other discrete or integrated logic circuitry having similar processing capabilities.

The processing device 702 and the memory 704 can be included in components provided in the FPGA, ASCI, microcontroller, or microprocessor, for example. Memory 704 can include, for example, volatile and non-volatile memory for storing data temporarily or long term, and for storing programmable instructions executable by the processing device 702. I/O I/F 706 can include an interface and/or conductors to couple to the one or more internal components 708 and/or external components 710.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the block diagram block or blocks.

Embodiments of the controller 26 may be implemented or executed by one or more computer systems, such as a microprocessor. Each computer system 700 can implement controller 26, or multiple instances thereof. In various embodiments, computer system 700 may include one or more of a microprocessor, an FPGA, application specific integrated circuit (ASCI), microcontroller. The computer system 700 can be provided as an embedded device. All or portions of the computer system 700 can be provided externally, such by way of a mobile computing device, a smart phone, a desktop computer, a laptop, or the like.

Computer system 700 is only one example of a suitable system and is not intended to suggest any limitation as to the scope of use or functionality of embodiments of the disclosure described herein. Regardless, computer system 700 is capable of being implemented and/or performing any of the functionality set forth hereinabove.

Computer system 700 may be described in the general context of computer system-executable instructions, such as program modules, being executed by a computer system. Generally, program modules may include routines, programs, objects, components, logic, data structures, and so on that perform particular tasks or implement particular abstract data types.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A matrix converter system having a current control mode operation comprising:
   a matrix converter having a switching matrix, wherein the matrix converter is coupled at its low voltage side to a generator and at its output load side to a load;
   a unity current reference vector generator that is configured to determine a unity current reference vector having an amplitude of one that defines an angle and frequency of an output current vector as a function of a reference phase angle, wherein the reference phase angle is a function of the output current vector and an output voltage vector that represent feedback signals of current and voltage output by the matrix converter, output to the load;
   a controller having a pulse width modulation (PWM) controller configured to control the matrix converter via its switching matrix to increase energy within internal inductances of the generator, wherein the controller receives the unity current reference vector and controls the matrix converter to cause the output current vector to be aligned with the unity current reference vector;
a unit voltage vector generator that is configured to provide a unity voltage reference vector having an amplitude of one that defines a reference angle and frequency as a function of a zero phase angle; and
a reference phase angle determination module that is configured to receive and align the output voltage vector and the unity voltage reference vector and to determine the reference phase angle as an angle between the aligned output voltage vector and the output current vector,
wherein the reference phase angle determination module including a current position shift regulator configured to shift position of the output current to adjust the reference phase angle until the reference phase angle equals zero.

2. The system of claim 1, wherein alignment of the output voltage vector and the unity voltage reference vector is performed within a single period of the output current or voltage.

3. The system of claim 1, wherein the reference phase angle determination module applies a phase locked loop to align the output current vector and the unity current reference vector.

4. The system of claim 1, further comprising Q and D harmonic regulators that are configured to operate, respectively, on differences between active Q and reactive D components of each of the unity voltage reference vector multiplied by a reference voltage and the output voltage vector to control the output voltage vector in a stationary reference frame through controlling the active Q and reactive D components of the output voltage.

5. The system of claim 4, wherein the active Q and reactive D components of the output vector are controlled individually.

6. The system of claim 1, further comprising a Q synchronous reference frame regulator that is configured to operate in a synchronous reference frame on a difference between an active Q component of a reference voltage multiplied by an active Q component of the unity voltage reference vector and an active Q component of the output voltage vector to output an active Q current component provided toward the low voltage side of the matrix converter.

7. The system of claim 6, further comprising a D synchronous reference frame regulator that is configured to operate in a synchronous reference frame on a difference between a reactive D component of a reference voltage multiplied by a reactive D component of the unity voltage reference vector and a reactive D component of the output voltage vector to determine the reference phase angle.

8. The system of claim 7, wherein the Q and D synchronous reference frame regulators are proportional integral (PI) regulators.

9. A matrix converter system having a current control mode operation comprising:
a matrix converter having a switching matrix, wherein the matrix converter is coupled at its low voltage side to a generator and at its output load side to a load;
a unity current reference vector generator that is configured to determine a unity current reference vector having an amplitude of one that defines an angle and frequency of an output current vector as a function of a reference phase angle, wherein the reference phase angle is a function of the output current vector and an output voltage vector that represent feedback signals of current and voltage output by the matrix converter, output to the load;
a controller having a pulse width modulation (PWM) controller configured to control the matrix converter via its switching matrix to increase energy within internal inductances of the generator, wherein the controller receives the unity current reference vector and controls the matrix converter to cause the output current vector to be aligned with the unity current reference vector;
a unit voltage vector generator that is configured to provide a unity voltage reference vector having an amplitude of one that defines a reference angle and frequency as a function of a zero phase angle;
a reference phase angle determination module that is configured to receive and align the output voltage vector and the unity voltage reference vector and to determine the reference phase angle as an angle between the aligned output voltage vector and the output current vector; and
Q and D harmonic regulators that are configured to operate, respectively, on differences between active Q and reactive D components of each of the unity voltage reference vector multiplied by a reference voltage and the output voltage vector to control the output voltage vector in a stationary reference frame through controlling the active Q and reactive D components of the output voltage,
wherein the Q and D harmonic regulators are configured to apply a transfer function to the differences, and
wherein the transfer function uses a proportional gain Kp and integration of a harmonic component having a resonant frequency $\omega$ and an integral gain KI.

10. A method of controlling operation of a matrix converter operating in a current control mode operation, the matrix converter including a plurality of switches, the matrix converter coupled at its input to a multiphase voltage source input and outputting a multiphase output signal to a load, the method comprising:
determining a unity current reference vector having an amplitude of one that defines an angle and frequency of an output current vector as a function of a reference phase angle, wherein the reference phase angle is a function of the output current vector and an output voltage vector that represent feedback signals of current and voltage, respectively, of the multiphase output signal;
receiving the unity current reference vector;
controlling pulse width modulation (PWM) to control the matrix converter via the plurality of switches to generate energy within internal inductances of a generator of the multiphase voltage source and to cause the output current vector to be aligned with the unity current reference vector;
providing, at a time t, a unity voltage reference vector having an amplitude of one that defines a reference angle and frequency as a function of a zero phase angle;
receiving and aligning the output voltage vector and the unity voltage reference vector; and
determining the reference phase angle as an angle between the aligned output voltage vector and the output current vector,
wherein aligning the output voltage vector and the unity voltage reference vector includes shifting position of the output current to adjust the reference phase angle until the reference phase angle equals zero.

11. The method of claim 10, wherein alignment of the output voltage vector and the unity voltage reference vector is performed within a single period of the multiphase output signal.

12. The method of claim 10, further comprising applying a phase locked loop to align the output current vector and the unity current reference vector.

13. The method of claim 10, further comprising operating, respectively, on differences between active Q and reactive D components of each of the unity voltage reference vector multiplied by a reference voltage and the output voltage vector to control the output voltage vector in a stationary reference frame through controlling the active Q and reactive D components of the output voltage.

14. The method of claim 13, wherein the active Q and reactive D components of the output vector are controlled individually.

15. The method of claim 10, further comprising operating in a synchronous reference frame on a difference between an active Q component of a reference voltage multiplied by an active Q component of the unity voltage reference voltage and an active Q component of the output voltage vector to output an active Q current component provided toward the low voltage side of the matrix converter.

16. The method of claim 10, further comprising operating in a synchronous reference frame on a difference between a reactive D component of a reference voltage multiplied by a reactive D component of the unity voltage reference voltage and a reactive D component of the output voltage vector to determine the reference phase angle.

17. The method of claim 10, further comprising operating in a synchronous reference frame and controlling the output voltage vector in the synchronous reference frame, wherein controlling the output voltage vector in the synchronous reference frame includes applying a proportional integral process.

18. A method of controlling operation of a matrix converter operating in a current control mode operation, the matrix converter including a plurality of switches, the matrix converter coupled at its input to a multiphase voltage source input and outputting a multiphase output signal to a load, the method comprising:

determining a unity current reference vector having an amplitude of one that defines an angle and frequency of an output current vector as a function of a reference phase angle, wherein the reference phase angle is a function of the output current vector and an output voltage vector that represent feedback signals of current and voltage, respectively, of the multiphase output signal;

receiving the unity current reference vector;

controlling pulse width modulation (PWM) to control the matrix converter via the plurality of switches to generate energy within internal inductances of a generator of the multiphase voltage source and to cause the output current vector to be aligned with the unity current reference vector;

providing, at a time t, a unity voltage reference vector having an amplitude of one that defines a reference angle and frequency as a function of a zero phase angle;

receiving and aligning the output voltage vector and the unity voltage reference vector;

determining the reference phase angle as an angle between the aligned output voltage vector and the output current vector; and operating, respectively, on differences between active Q and reactive D components of each of the unity voltage reference vector multiplied by a reference voltage and the output voltage vector to control the output voltage vector in a stationary reference frame through controlling the active Q and reactive D components of the output voltage, wherein controlling the active Q and reactive D components of the output voltage includes applying a transfer function to the differences, and wherein the transfer function uses a proportional gain Kp, and integration of a harmonic component having a resonant frequency ω and an integral gain KI.

* * * * *